(12) United States Patent
Kawauchi et al.

(10) Patent No.: US 10,793,035 B2
(45) Date of Patent: Oct. 6, 2020

(54) SEAT FRAME, AND METHOD FOR MANUFACTURING SEAT FRAME

(71) Applicant: TACHI-S CO., LTD., Akishima-shi, Tokyo (JP)

(72) Inventors: Noriaki Kawauchi, Akishima (JP); Satoshi Hashimoto, Akishima (JP); Shun Takagi, Akishima (JP); Hiromi Yamamoto, Akishima (JP)

(73) Assignee: TACHI-S CO., LTD., Akishima-Shi, Tokyo (JP)

( * ) Notice: Subject to any disclaimer, the term of this patent is extended or adjusted under 35 U.S.C. 154(b) by 132 days.

(21) Appl. No.: 15/571,311

(22) PCT Filed: Feb. 18, 2016

(86) PCT No.: PCT/JP2016/054629
§ 371 (c)(1),
(2) Date: Nov. 2, 2017

(87) PCT Pub. No.: WO2016/181677
PCT Pub. Date: Nov. 17, 2016

(65) Prior Publication Data
US 2019/0152364 A1 May 23, 2019

(30) Foreign Application Priority Data
May 12, 2015 (JP) .................. 2015-097588

(51) Int. Cl.
*B60N 2/68* (2006.01)
*B60N 2/22* (2006.01)

(52) U.S. Cl.
CPC ............... *B60N 2/682* (2013.01); *B60N 2/22* (2013.01); *B60N 2/68* (2013.01)

(58) Field of Classification Search
CPC .................. B60N 2/68; B60N 2/682
See application file for complete search history.

(56) References Cited

U.S. PATENT DOCUMENTS 5,165,756 A * 11/1992 Baker ...................... A47C 7/40
297/354.12
5,333,775 A * 8/1994 Bruggemann .......... B21C 37/06
228/155
(Continued)

FOREIGN PATENT DOCUMENTS

CN          1097970 A     2/1995
JP      H 06-071364 A     3/1994
(Continued)

OTHER PUBLICATIONS

International Search Report (ISR) (PCT Form PCT/ISA/210), in PCT/JP2016/054629, dated May 24, 2016.
(Continued)

*Primary Examiner* — David R Dunn
*Assistant Examiner* — Tania Abraham
(74) *Attorney, Agent, or Firm* — McGinn I. P. Law Group, PLLC

(57) ABSTRACT

A seat frame for a framework structure of a vehicle seat includes a plurality of frame bodies formed by bending a single tubular member. The single tubular member is formed in a closed cross-sectional shape by a single long and flat member being bent in a direction that is at a right angle with respect to the lengthwise direction of the long and flat member, and then end edges of the tubular member that have come to face each other being joined together by welding. Each of the plurality of frame bodies includes a bend part and rectilinear parts. The bend part is rectangular in cross section. The rectilinear parts include a rectangular cross section portion and a cross-section-varying portion. The end part of the cross-section-varying portion, connected to the rectangular cross section portion, is rectangular in cross section.

13 Claims, 12 Drawing Sheets

(56) References Cited

U.S. PATENT DOCUMENTS

| | | | | | |
|---|---|---|---|---|---|
| 5,567,017 | A | * | 10/1996 | Bourgeois | A47C 7/40 297/228.13 |
| 5,749,135 | A | * | 5/1998 | Crane | B60N 2/682 29/415 |
| 5,988,756 | A | * | 11/1999 | Aufrere | B60N 2/68 297/391 |
| 6,322,148 | B1 | * | 11/2001 | Kolena | B60N 2/682 297/354.12 |
| 6,767,067 | B2 | * | 7/2004 | Fourrey | B29C 70/44 297/452.18 |
| 8,061,779 | B2 | * | 11/2011 | Nakagaki | B60N 2/686 297/440.2 |
| 8,132,862 | B2 | * | 3/2012 | Yamada | B60N 2/688 297/216.13 |
| 8,814,273 | B2 | * | 8/2014 | Zekavica | B60N 2/68 297/378.1 |
| 9,027,225 | B2 | * | 5/2015 | Zekavica | B60N 2/682 29/525.14 |
| 2007/0210638 | A1 | * | 9/2007 | Adragna | B60N 2/68 297/452.2 |
| 2011/0163587 | A1 | * | 7/2011 | Kmeid | B60N 2/68 297/452.2 |
| 2012/0074755 | A1 | * | 3/2012 | Matthey | B60N 2/688 297/452.18 |

FOREIGN PATENT DOCUMENTS

| | | |
|---|---|---|
| JP | H 07-031526 A | 2/1995 |
| JP | H 09-252873 A | 9/1997 |
| JP | 2005-067332 A | 3/2005 |
| JP | 2010-046162 A | 3/2010 |
| JP | 2013-112229 A | 6/2013 |
| JP | 2013-248953 A | 12/2013 |
| JP | 2015-085830 A | 5/2015 |

OTHER PUBLICATIONS

Chinese Office Action, dated Dec. 27, 2018, in Chinese Application No. 201680027347.2 and English Translation (with a Generic Translation of Search Report).

* cited by examiner

E-CROSS SECTION    F-CROSS SECTION

SEAT FRAME, AND METHOD FOR MANUFACTURING SEAT FRAME

TECHNICAL FIELD

The present invention relates to a seat frame for a framework structure of a vehicle seat. The present invention also relates to a method for manufacturing the seat frame. A seat frame is a back frame, which is the framework structure of a seat back, a cushion frame, which is the framework structure of a seat cushion, and other types of frames.

BACKGROUND ART

Conventionally known is a seat frame disclosed in Patent Citation 1. This seat frame has a pair of side frames facing each other, and a linkage frame (stated as horizontal part in Patent Citation 1) connecting the side frames together. The cross-sectional shape of the seat frame is a rectangular closed cross-sectional shape. A closed cross-sectional shape is a shape in which the cross section is not open and is closed. This rectangular closed cross-sectional shape is formed by two types of angle materials that are c-shaped in cross section being joined to each other by welding.

In this conventional seat frame, two types of angle materials that are c-shaped in cross section must be prepared in order to form a closed cross-sectional shape, and therefore, there is a problem in that the component cost is higher. Also, the two types of angle materials that are c-shaped in cross section must be welded together, and therefore, there is a problem in that work is laborious and manufacturing costs are higher.

Conventionally known is a seat frame disclosed in Patent Citation 2. In this seat frame, a long narrow member is bent to thereby form a seat frame in which the front surface shape is substantially c-shaped. Also, the cross-sectional shape of the long member is formed in shape that is c-shaped in cross section (i.e., an open cross-sectional shape in which one side is open).

In the seat frame disclosed in Patent Citation 2, the cross-sectional shape of the long member is c-shaped, and therefore, the thickness of the long member is required to be high in order to maintain high strength. Consequently, there is a problem in that the long member is heavy and component cost is high.

CITATION LIST

Patent Literature (Patent Citation 1): JP-A 2010-046162
(Patent Citation 2): JP-A 2013-112229

SUMMARY OF INVENTION

Technical Problem

The present invention was devised in view of the above-described problems in conventional seat frames, and an object thereof is to provide a low-weight, low-cost seat frame with high strength, and a method for manufacturing the seat frame.

Solution to Problem

The seat frame according to the present invention is a seat frame for a framework structure of a vehicle seat, including at least one frame body formed by bending a single tubular member, wherein the single tubular member is formed in a closed cross-sectional shape by a single long and flat member being bent in a direction that is at a right angle with respect to the lengthwise direction of the long and flat member, and then the end edges of the tubular member that have come to face each other being joined together by welding, and at least a portion of the frame body is rectangular in cross section.

In accordance with the present invention, the frame body, which is the main portion of the seat frame, can be fabricated by a single flat plate member being bent several times, and furthermore undergoing a very simple process of simple partial welding. The seat frame can therefore be fabricated in a simple manner at low cost.

In the present invention, a frame body is formed by a tubular member having a closed cross section in which at least a portion is rectangular in cross section, and therefore it is possible for the frame body to obtain sufficient strength. It is thereby possible to obtain a seat frame having high strength while being lightweight.

An aspect of the seat frame according to the present invention comprises a single frame body, and the frame body comprises two side frames corresponding to both left and right side surfaces of a vehicle seat, and a linkage frame connecting the side frames. In accordance with this aspect, a seat frame advantageous for a single-person front seat such as a driver's seat or a passenger's seat can be fabricated in a simple manner with high strength.

In another aspect of the seat frame according to the present invention, a portion of the tubular member being bent is circular in cross section, and portions of the tubular member corresponding to the side frames are rectangular in cross section. In accordance with this aspect, the portion to be bent is readily bent, and furthermore, the strength of the portion that requires high strength can be increased.

In another aspect of the seat frame according to the present invention, a reinforcement plate is joined to a portion of the tubular member that corresponds to the portion at the lower end of the side frame where a recliner is mounted, and the portion of the tubular member opposing the portion where the reinforcement plate is joined is notched so that the reinforcement plate is exposed.

In accordance with this aspect, a reinforcement plate is provided to the mounting portion of the recliner, and therefore, the strength capable of firmly supporting the recliner can be ensured even when the thickness of the other portions of the seat frame is reduced. Also, a notched part is provided to the portion corresponding the reinforcement plate to considerably open the periphery of the reinforcement plate, and therefore, the work of mounting a recliner can be easily carried out.

Another aspect of the seat frame according to the present invention comprises a plurality of frame bodies, wherein the plurality of frame bodies are linked to each other at the rectangular-cross-section portions of the frame bodies by a linkage. In accordance with this aspect, a plurality of frame bodies are linked together, thereby allowing seat frames of various shapes to be formed. Also, the plurality of frame bodies are linked together by a linkage at the rectangular-cross-section portion which is a portion having high-strength, resulting in obtaining a high-strength of seat frames.

In another aspect of the seat frame according to the present invention, the portion of the tubular member being bent is circular in cross section. As a result, the bend portion can be readily bent, and the bending precision can be kept high.

In another aspect of the seat frame according to the present invention, the portion between the portion of the tubular member that is circular in cross section and the portion of the tubular member that is rectangular in cross section gradually varies in cross-sectional shape. In accordance with this aspect, the portion where the cross-sectional shape of the tubular member varies rapidly do not occur, and therefore, it is possible to prevent the occurrence of portions where strength is dramatically reduced in a seat frame formed by a tubular member being machined.

In another aspect of the seat frame according to the present invention, a process for causing the end edges of the tubular members to face each other by a single long and flat member being bent in a direction that is at a right angle with respect to the lengthwise direction of the long and flat member includes a plurality of bending processes. In accordance with this aspect, a tubular member can be fabricated without difficulty and without generating excessive stress in the single flat plate.

Next, the method for manufacturing a seat frame according to the present invention is a method for manufacturing a seat frame for a framework structure of a vehicle seat, including bending a single long and flat member in a direction that is at a right angle with respect to the lengthwise direction of the long and flat member; joining by welding end edges of tubular members that have come to face each other by the bending, and thereby forming a single tubular member having a closed cross-sectional shape and at least a portion of which is rectangular in cross section; forming a frame body having predetermined shape by the single tubular member being bent; and forming a seat frame using a single frame body or a plurality of frame bodies.

In accordance with this method for manufacturing a seat frame, the frame body, which is the main portion of the seat frame, can be fabricated by a very simple process in which the single flat member is bent several times and then undergoes a simple partial welding. The seat frame can therefore be fabricated in a simple manner at low cost.

Also, in accordance with the manufacturing method of the present invention, a frame body is formed by a tubular member, at least a portion of which is a rectangular shape in cross section having a closed cross-sectional shape, and therefore, a seat frame sufficient in strength can be manufactured. It is thereby possible to obtain a seat frame having high strength while being lightweight.

Advantageous Effects of Invention

In accordance with the seat frame and method for manufacturing a seat frame according to the present invention, the frame body, which is the main portion of the seat frame, can be fabricated by a very simple process in which the single flat member is bent several times, and then undergoes a simple partial welding. The seat frame can therefore be fabricated in a simple manner at low cost.

Also, in the present invention, a frame body is formed by a tubular member, at least a portion of which is a rectangular shape in cross section having a closed cross-sectional shape, and therefore, a seat frame sufficient in strength can be manufactured. It is thereby possible to obtain a seat frame having high strength while being lightweight.

DESCRIPTION OF EMBODIMENTS

Figure 1:
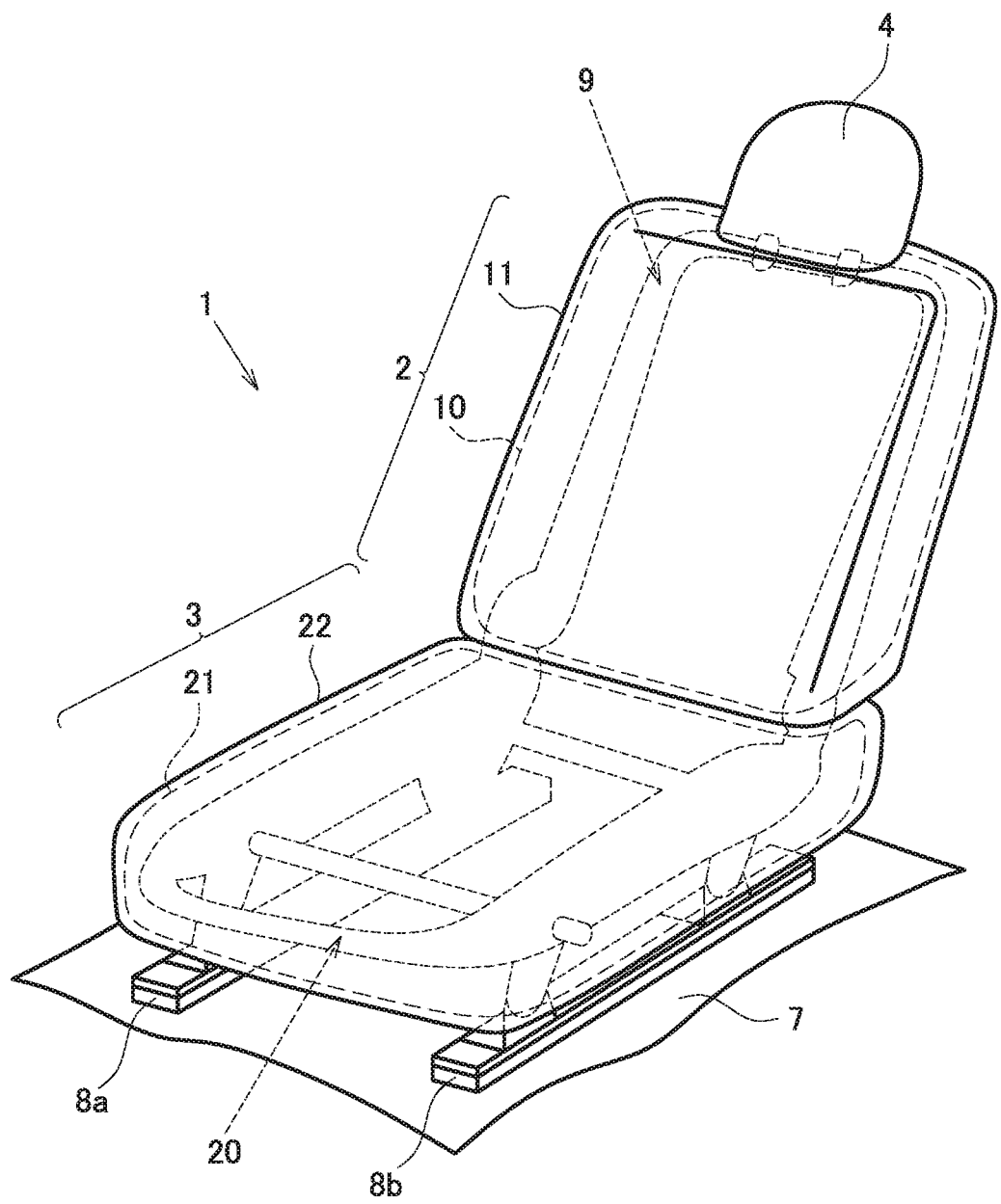
FIG. 1 is a perspective view showing an example of a vehicle seat into which the seat frame according to the present invention has been built.

The seat frame and the method for manufacturing the seat frame according to the present invention are described below using embodiments. Naturally, the present invention is not limited by these embodiments. The constituent elements may be described using ratios that are different from actual components in order to facilitate description of characteristic portions in the drawings attached to the present specification.

First Embodiment

FIG. 1 shows an example of a vehicle seat into which the seat frame according to the present invention has been built. The vehicle seat 1 is a front section seating (i.e., a front seat) such as a driver's seat, passenger's seat or the like. The vehicle seat 1 has a seat back 2 for accommodating the back of a seated person, a seat cushion 3 on which the buttocks of the seated person rests, and a headrest 4 for accommodating the head of a seated person. In the present embodiment, the seat back 2 alone will be referred to as vehicle seat, and the seat cushion 3 alone will also be referred to as vehicle seat.

The seat cushion 3 rests on rails 8a and 8b which are installed on a floor 7 of the vehicle. The seat cushion 3 is able to move along the rails 8a, 8b towards the front or towards the back. The seat back 2 is disposed in an erect state, i.e., in a standing state, on the far side end part of the seat cushion 3. The headrest 4 is disposed on the upper end part of the seat back 2.

The seat back 2 has a back frame 9, which is a framework structure serving as the seat frame, a pad 10, which is an elastic member disposed at the periphery of the back frame 9, and a surface skin 11 covering the pad 10. The pad 10 is formed by, e.g., foamed urethane resin. The surface skin 11 is formed by a soft material such as fabric, leather, synthetic leather, or other material pleasant to the touch. The fabric is a cloth such as a woven or knitted material.

Figure 2:
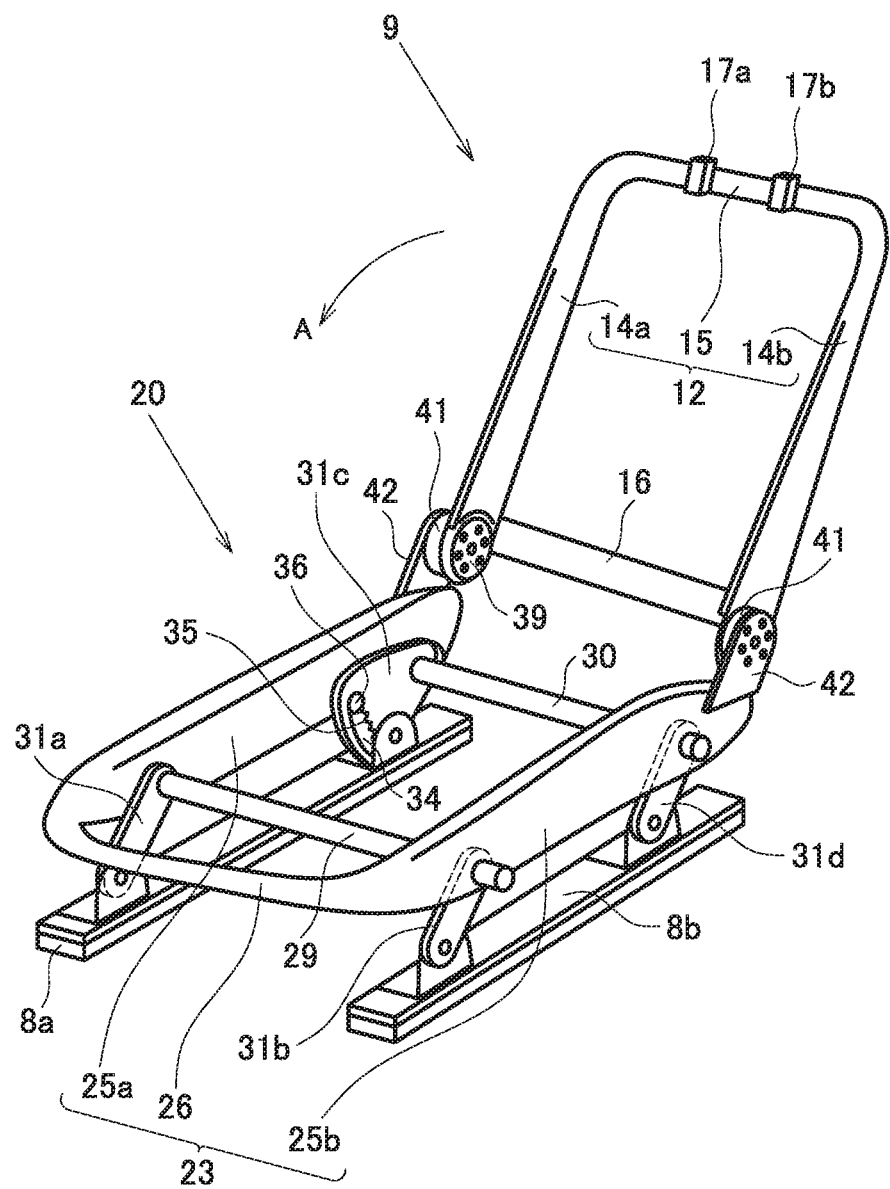
FIG. 2 is a perspective view showing a back frame and cushion frame, which are embodiments of the seat frame according to the present invention.

The back frame 9 has a frame body 12 as shown in FIG. 2. The frame body 12 has a left-side side frame 14a, a right-side side frame 14b, and an upper linkage frame 15. The upper linkage frame 15 links the left and right side frames 14a, 14b at the upper parts thereof. The lower end part of the left-side side frame 14a and the lower end part of the right-side side frame 14b are connected by a lower linkage frame 16. Headrest guides 17a, 17b, which are cylindrical brackets for mounting the headrest 4 of FIG. 1, are mounted on the front-side side surface of the upper linkage frame 15.

In FIG. 1, the seat cushion 3 has a cushion frame 20, which is a framework structure serving as the seat frame, a pad 21, which is an elastic member disposed at the periphery of the cushion frame 20, and a surface skin 22 covering the pad 21. The pad 21 is formed by, e.g., foamed urethane resin. The surface skin 22 is formed by a soft material such as fabric, leather, synthetic leather, or other material pleasant to the touch. The fabric is a cloth such as a woven or knitted material.

The cushion frame 20 has a frame body 23 as shown in FIG. 2. The frame body 23 has a left-side side frame 25a, a right-side side frame 25b, and a linkage frame 26. The linkage frame 26 links the left and right side frames 25a, 25b at the distal ends thereof. A front rod 29 is provided to the front part of the left and right side frames 25a, 25b. A rear rod 30 is provided to the rear part of the left and right side frames 25a, 25b.

The left end of the front rod 29 is linked to the front part of the rail 8a by a link 31a. The right end of the front rod 29 is linked to the front part of the rail 8b by a link 31b. The left end of the rear rod 30 is linked to the rear part of the rail 8a by a link 31c. The right end of the rear rod 30 is linked to the rear part of the rail 8b by a link 31d.

The rear left-side link 31c of the four links is a drive link. Specifically, an arcuate slot 34 is provided to the forward portion of the link 31c, internal teeth 35 are provided to the side surface of the slot 34, and external teeth of a gear 36 meshes with the internal teeth 35. The gear 36 is rotated, whereby the link 31c can be pivoted upward or downward. When the link 31c pivots upward, the cushion frame 20 is lifted upward. At this time, the other links 31a, 31b, 31d pivot in a following fashion. When the link 31c pivots downward, the cushion frame 20 drops downward. At this time, the other links 31a, 31b, 31d pivot in a following fashion. In this manner, a height adjuster or lifting device of the vehicle seat 1 (see FIG. 1) is configured from rods 29, 30 and links 31a, 31b, 31c, 31d.

Figure 3:
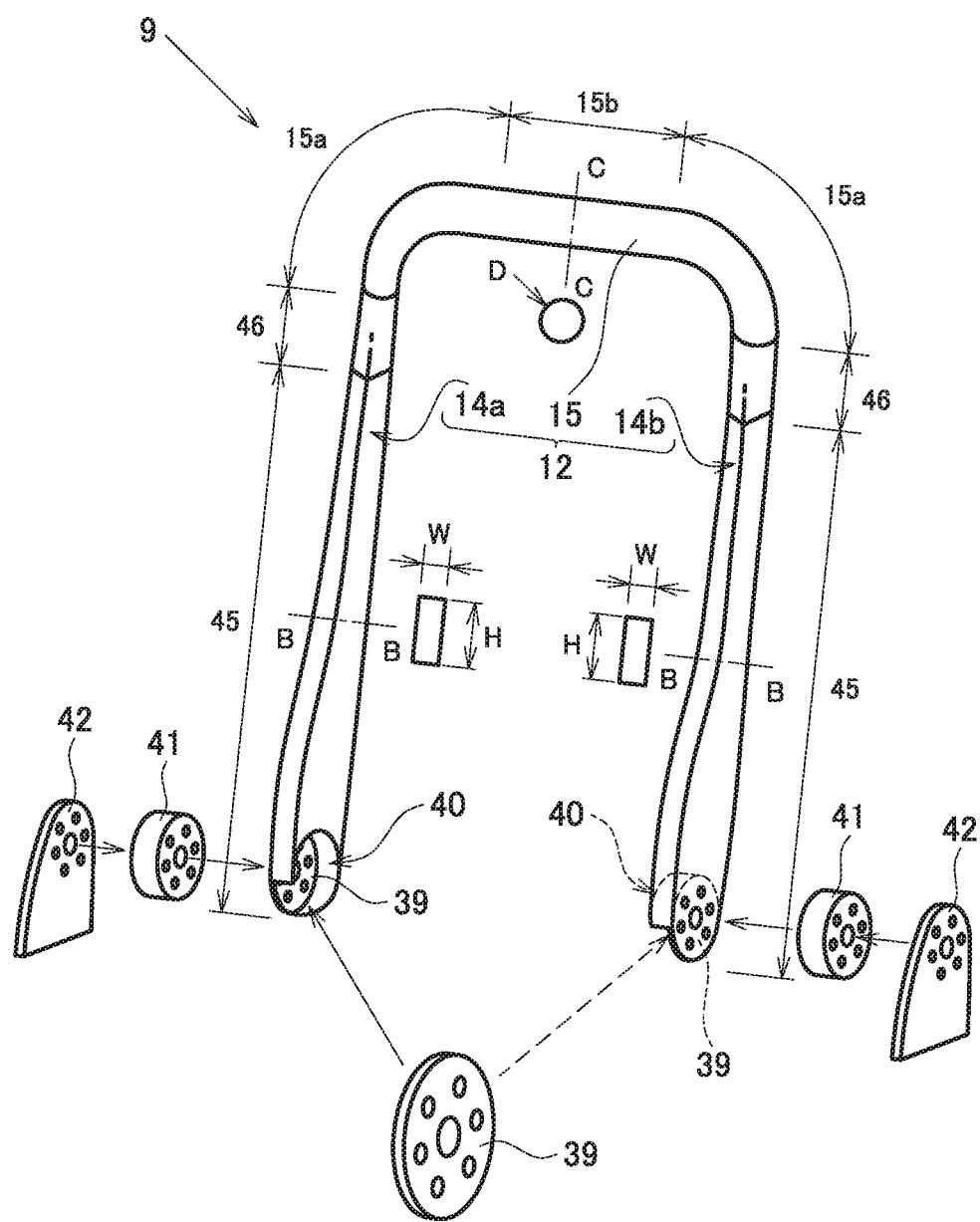
FIG. 3 is a perspective view showing an enlarged view of the back frame of FIG. 2.

FIG. 3 shows the structure prior to the headrest guides 17a, 17b and the lower linkage frame 16 being mounted on the back frame 9 of FIG. 2. In FIG. 3, a reinforcement plate 39 is secured by welding or the like to the lower end part of the left and right side frames 14a, 14b. A notch 40 is formed in the inner side wall of the left and right side frames 14a, 14b facing the reinforcement plate 39. Providing a notch 40 exposes the reinforcement plate 39 to the exterior, i.e., makes the reinforcement plate visible from the exterior.

A recliner 41, which is a tilting movement mechanism, and brackets 42, which is a support plate, are secured by a fastener such as a bolt to the outer surface of the left and right side frames 14a, 14b in portions where the reinforcement plate 39 is provided. These brackets 42 are secured by a fastener such as a bolt to the rear end part of the left and right side frames 25a, 25b, respectively, of the cushion frame 20 as shown in FIG. 2.

The back frame 9 is thereby linked to the cushion frame 20 via the recliner 41. The recliner 41 is a known tilting movement mechanism. The recliner 41 internally has an elastic member, e.g., a coil spring. This coil spring elastically urges the back frame 9 to tiltably move toward the cushion frame 20 as indicated by the arrow A in FIG. 2. The recliner 41 can assume two states, namely, a locked state for securing the back frame 9 so that the back frame does not tiltably move, and an unlocked state for allowing the back frame 9 to freely move in tilting fashion.

When the back frame 9 is in an unlocked state, a seated person can tiltably move the back frame 9 forward (direction of arrow A) in accordance with the spring force (i.e., elastic force) of the coil spring, or tiltably move the back frame 9 rearward against the spring force of the coil spring. Setting the recliner 41 in a locked state after the back frame 9 has been tiltably moved in either of the above directions allows the back frame 9 to be secured in the tilted position. The seat back 2 of FIG. 1 can thereby be set in a desired tilt angle position in accordance with the back frame 9.

In FIG. 3, the side frames 14a, 14b of the back frame 9 comprise a rectangular cross section portion 45 and a cross-section-varying portion 46. The cross section of the rectangular cross section portion 45 is a rectangular shape having a width W and a height H, as indicated by, e.g., the cross section B-B. The rectangular cross section portion 45 has a fixed width W from the lower end to the upper end, and a height H that gradually decreases from the lower end to the upper end. The cross-section-varying portion 46 gradually varies in cross-sectional shape from a rectangular shape to a circular shape in progress from the lower end part to the upper end part, the lower end part connected to the rectangular cross section portion 45 being rectangular in cross section, and the upper end part connected to the upper linkage frame 15 being circular in cross section.

The upper linkage frame 15 of the back frame 9 comprises a bend part 15a and a rectilinear part 15b. The cross section of the bend part 15a and the rectilinear part 15b has a circular shape as shown by the reference sign D as indicated by, e.g., the cross section C-C. The radius of the circular cross section of the upper linkage frame 15 is fixed across the entire circular cross section.

(Fabrication of the Frame Body 12 of the Back Frame 9)

The structure of the frame body 12 of the back frame 9 is described in detail below. First, in FIG. 4, a single starting material 50 is prepared. The starting material 50 is, e.g., an iron material, for example, common steel or high-strength steel. The starting material 50 may be light metal, e.g., aluminum, magnesium, or the like. The thickness of the starting material 50 is 0.5 to 0.8 mm when common high-strength steel having, e.g., iron as a main component is used. The thickness of the starting material varies in accordance with the required material strength and the required performance of the frame. The starting material 50 is punched to fabricate a blank 51, the reinforcement plate 39 (see FIG. 3), and the lower linkage frame 16. The reinforcement plate 39 and the lower linkage frame 16 additionally undergo screw-hole machining and other required processing.

Figure 5:
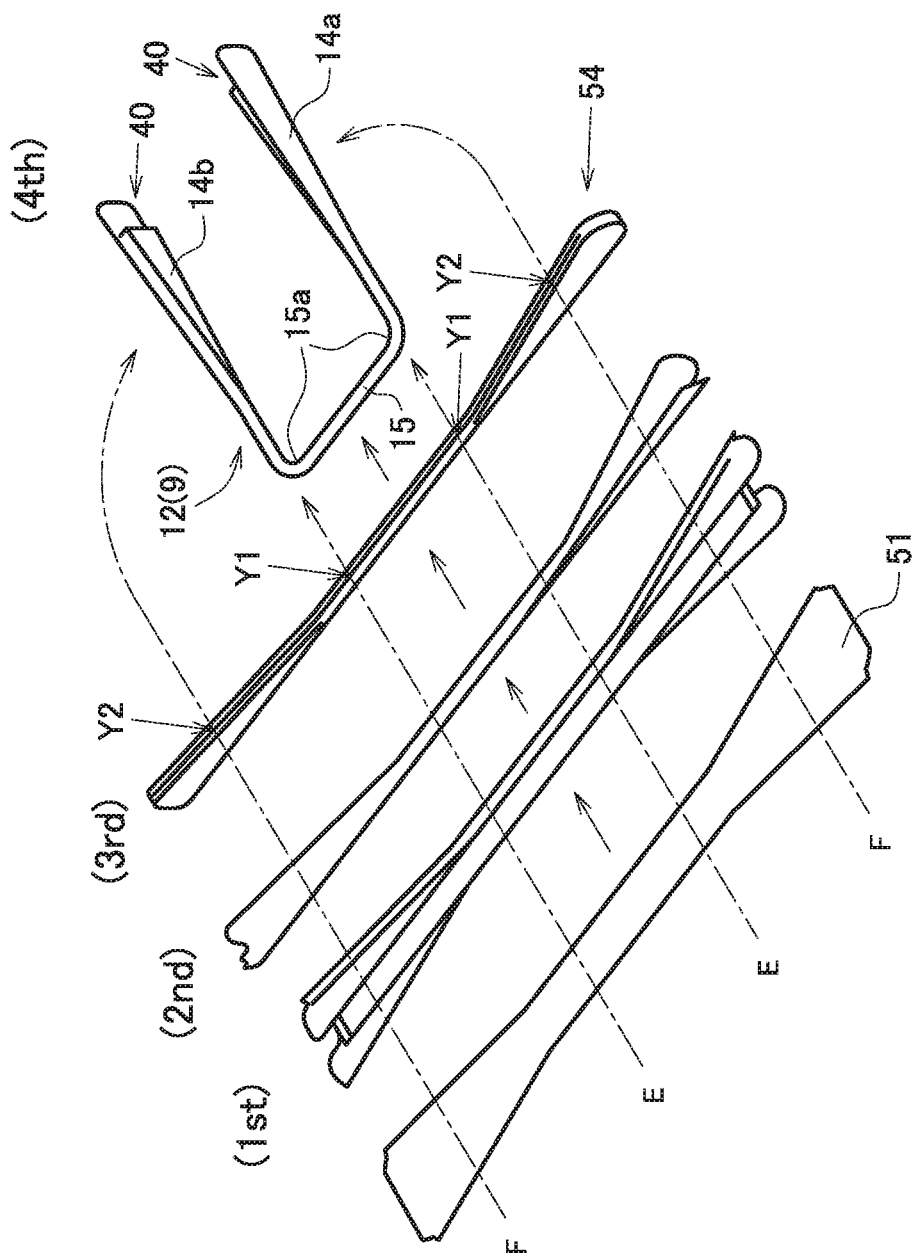
FIG. 5 shows the process for manufacturing the frame body, which is the main part of the back frame of FIG. 3.
Figure 6:
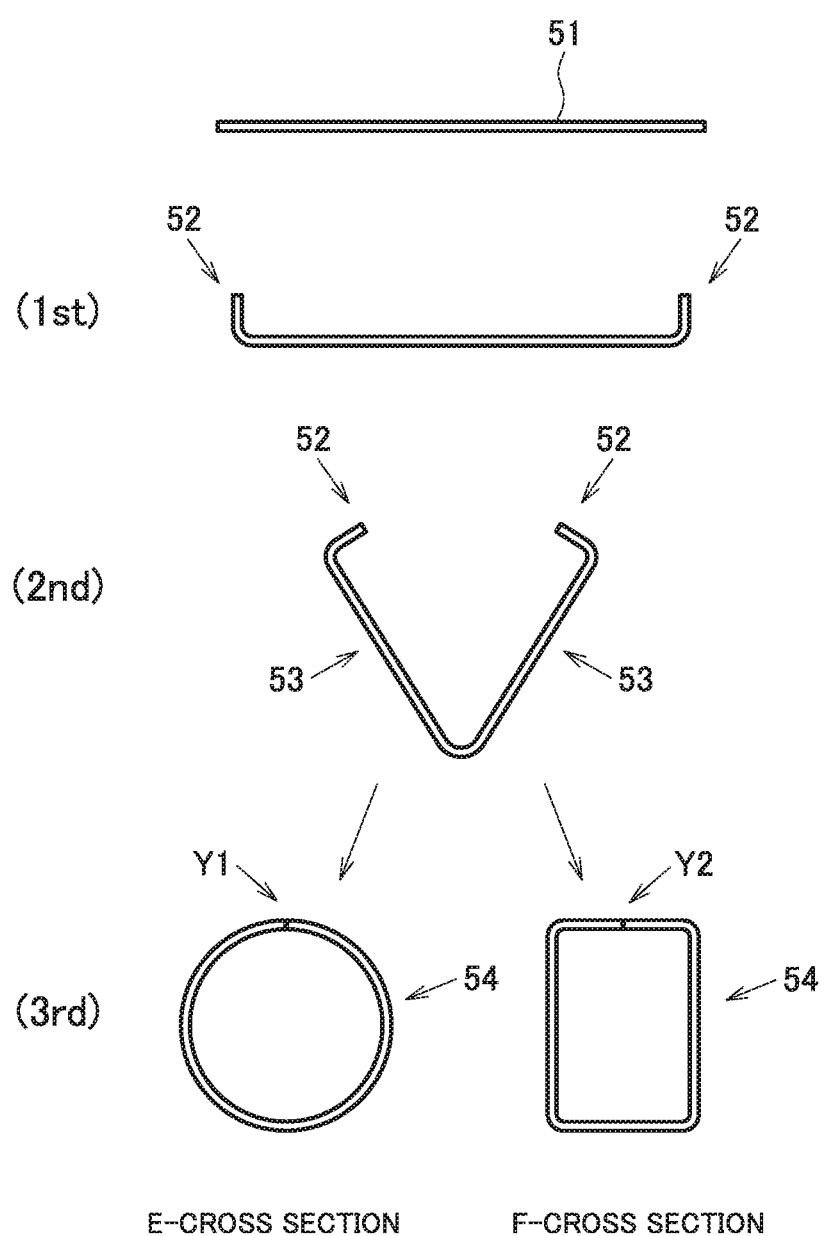
FIG. 6 shows the manner in which the cross-sectional shape of the starting material varies in the manufacturing process of FIG. 5.

Thereafter, in FIG. 5, the blank 51 is bent from the direction that is at a right angle with respect to the lengthwise direction. Specifically, first bending (1st), second bending (2nd), third bending (3rd), and fourth bending (4th) is carried out to fabricate the frame body 12 of the back frame 9. FIG. 6 shows state of variation in cross-section of the blank 51 after each bending process has been carried out.

In FIGS. 5 and 6, observing the variation in cross section (E cross section of FIG. 5) of the location of the bend part 15a of the upper linkage frame 15, first, both ends 52 of the blank 51 are bent slightly in the first bending (1st), as shown in FIG. 6. Next, a side surface 53 is considerably bent in the second bending (2nd), and is subsequently bent into a circular shape in cross section in the third bending (3rd) to obtain the tubular member 54. At this time, the end edges of the tubular member 54 come to face each other at the upper end of the cross section of the tubular member 54. The end edges are joined by welding as indicated by the reference sign Y1. These bending processes are carried out using a press mold in which the machining surface has a predetermined shape.

In FIGS. 5 and 6, observing the variation in cross section (F cross section of FIG. 5) of the location of the left and right side frames 14a, 14b, first, both ends 52 of the blank 51 are bent slightly in the first bending (1st), as shown in FIG. 6. Next, a side surface 53 is considerably bent in the second bending (2nd), and is subsequently bent into a rectangular shape in cross section in the third bending (3rd) to obtain the tubular member 54. At this time, the end edges of the tubular member 54 come to face each other at the upper end of the cross section of the tubular member 54. The end edges are joined by welding as indicated by the reference sign Y2. These bending processes are carried out using a press mold in which the machining surface has a predetermined shape.

The weld Y1 and the weld Y2 are performed simultaneously in a single welding step. The tubular member 54 of FIG. 5 is completed when the welding step is completed. The tubular member 54 is thereafter bent in the fourth bending (4th), the left and right side frames 14a, 14b are formed, and the upper linkage frame 15 is simultaneously formed. Notches 40 (see FIG. 3) are then furthermore formed in the distal end of the side frames 14a, 14b, whereby the frame body 12 is fabricated. The cross-sectional shape of the bend part 15a is circular, and is therefore easy to bend and bending can be carried out with high precision. On the other hand, the cross-sectional shape of the side frames 14a, 14b is rectangular, and strength can therefore be increased.

The reinforcement plate 39 in FIG. 3 is joined by welding or the like the two ends of the blank 51 together prior to undergoing the first bending (1st) in FIG. 5. Alternatively, the reinforcement plate 39 is joined by welding or the like the distal ends of both the side frames 14a, 14b after the notch 40 has been formed in the fourth bending (4th). The thickness of the reinforcement plate 39 is 0.5 to 1.0 mm when a common high-strength steel or the like having, e.g., iron as a main component is used. The thickness of the reinforcement plate 39 varies in accordance with the required material strength and the required performance of the frame. When the thickness of the starting material of the reinforcement plate 39 and the blank 51 is, e.g., 0.7 mm, the total thickness of the locations where the reinforcement plate 39 is joined is 1.4 mm, and sufficient thickness can be obtained in this portion.

As described above, the frame body 12 of the back frame 9 can be fabricated by a very simple step in which the blank 51, which is a single plate member, is bent several times and undergoes simple partial welding. Accordingly, costs are low and fabrication can be performed in an inexpensive manner.

In the present embodiment, the back frame 9 is formed fully or partially using a tubular member having a closed cross-sectional shape (i.e., a cross section in a closed state rather than an open state) which is circular in cross section and rectangular in cross section, and therefore, sufficient strength can be obtained by the closed cross-sectional shape and the thickness of the blank 51, which is the starting material, can be reduced to, e.g., 0.5 to 1.0 mm. It is thereby possible to obtain a back frame 9 having high strength while being lightweight.

(Frame Body 23 of the Cushion Frame 20)

Figure 7:
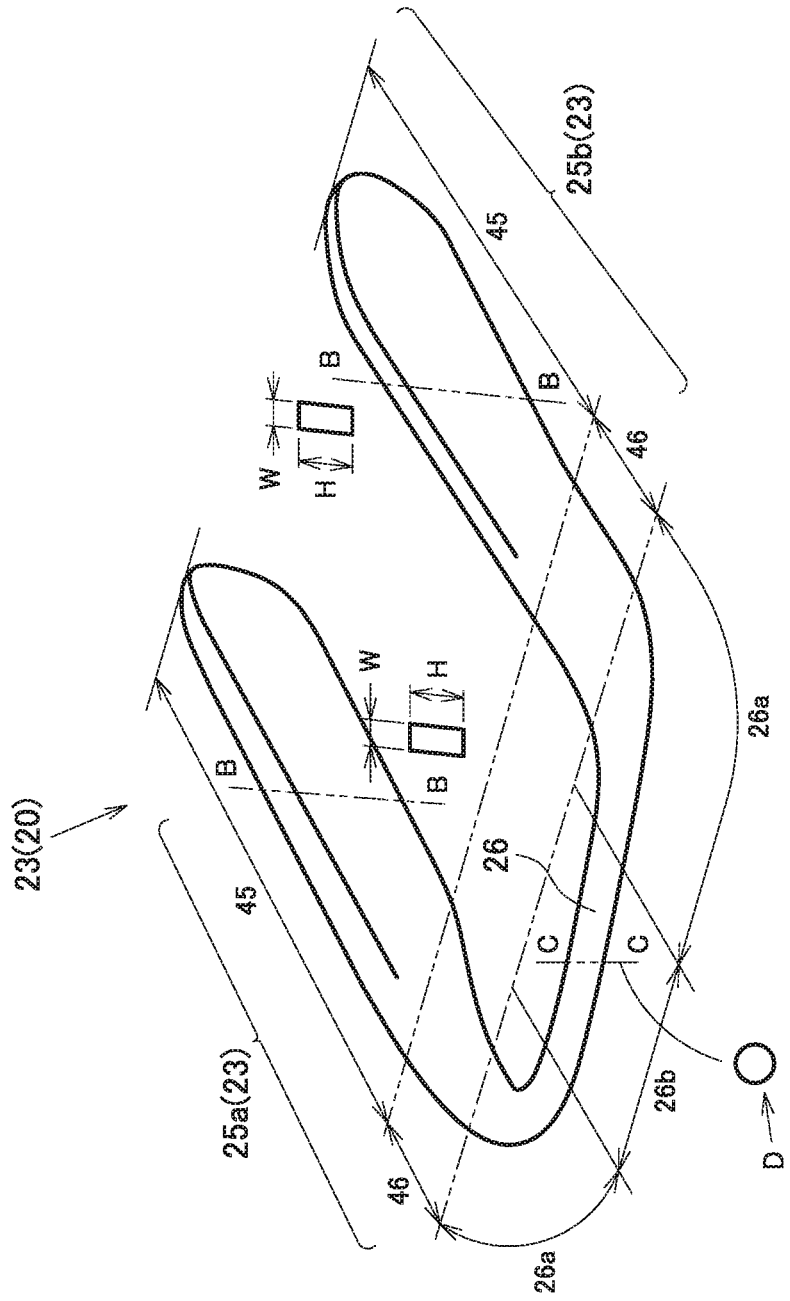
FIG. 7 is a perspective view showing an enlarged view of the frame body, which is the main part of the cushion frame of FIG. 2.

The side frames 25a, 25b of the frame body 23 of the cushion frame 20 in FIG. 2 comprise a rectangular cross section portion 45 and a cross-section-varying portion 46, as shown in FIG. 7. The cross section of the rectangular cross section portion 45 is rectangular having a width W and a height H as indicated by, e.g., the cross section B-B. The rectangular cross section portion 45 has a fixed width W from the depth-side end to front-side end, and a height H that gradually decreases from the depth-side end to the front-side end. The cross-section-varying portion 46 gradually varies in cross-sectional shape from a rectangular shape to a circular shape in progress from the depth-end side part to the front-side end part, the depth-side end part connected to the rectangular cross section portion 45 being rectangular in cross section, and the front-side end part connected to the linkage frame 26 being circular in cross section.

The linkage frame 26 of the cushion frame 20 is composed of a bend part 26a and a rectilinear part 26b. The cross section of the bend part 26a and the rectilinear part 26b is circular as shown by reference sign D as indicated by, e.g., the cross section C-C. The radius of the circular cross section of the linkage frame 26 is fixed for the entire linkage frame.

Figure 4:
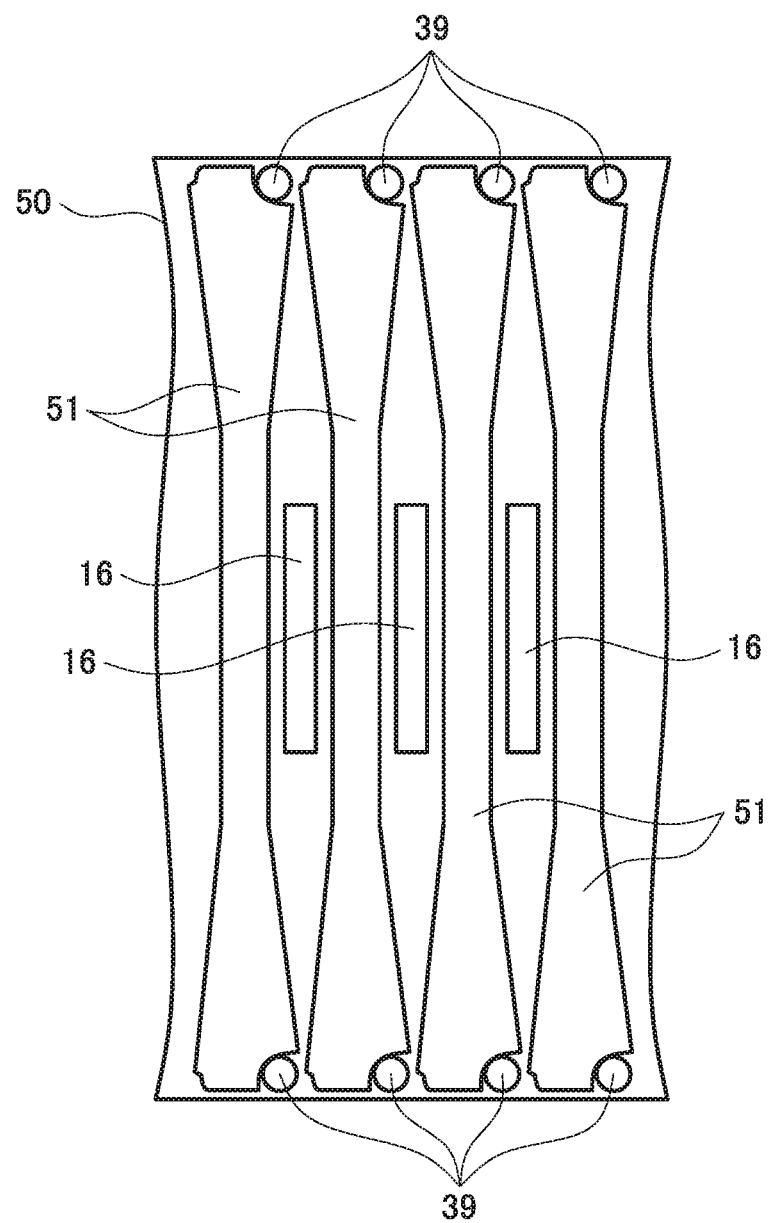
FIG. 4 is a plan view showing the starting materials of the frame body, which is the main part of the back frame of FIG. 3.

The frame body 23 of the cushion frame 20 is fabricated in the same manner as the fabrication of the frame body 12 of the back frame 9 described using FIG. 5. Specifically, first, the blank 51 having a shape suitable for the frame body 23 is punched out from the single starting material 50, as shown in FIG. 4. The blank 51 is subjected to the first bending (1st), the second bending (2nd), and the third bending (3rd) shown in FIG. 5, and a single tubular member 54 having a shape suitable for the frame body 23 is fabricated.

Next, the tubular member 54 undergoes the fourth bending (4th) and a frame body 23 such as shown in FIG. 7 is fabricated. The manner in which the cross-sectional shape of the blank 51 varies from the first bending (1st) to the third bending (3rd) is the same as the case of the frame body 12 of the back frame 9, and specifically, is as shown in FIG. 6.

As described above, the frame body 23 of the cushion frame 20 can be fabricated by a very simple process in which the blank 51, which is a single plate member, is bent several times and undergoes simple partial welding. Accordingly, costs are low and fabrication can be performed in an inexpensive manner.

In the present embodiment, the frame body 23 is formed by a tubular member having a closed cross-sectional shape that is circular in cross section and rectangular in cross section, and therefore, sufficient strength can be obtained by the closed cross-sectional shape, and the thickness of the blank 51, which is the starting material, can be reduced to, e.g., 0.5 to 1.0 mm when high-strength steel or the like having, e.g., iron as a main component is used. It is thereby possible to obtain a cushion frame 20 having high strength while being lightweight. The thickness of the starting material varies in accordance with the required material strength and the required performance of the frame.

(Modifications)

In the embodiment above, the present invention was used in both the back frame 9 as the seat frame and the cushion frame 20 as the seat frame in FIG. 2. However, the present invention can be applied to either the back frame 9 or the cushion frame 20, and the other may be a seat frame with a conventional structure.

Second Embodiment

Figure 8:
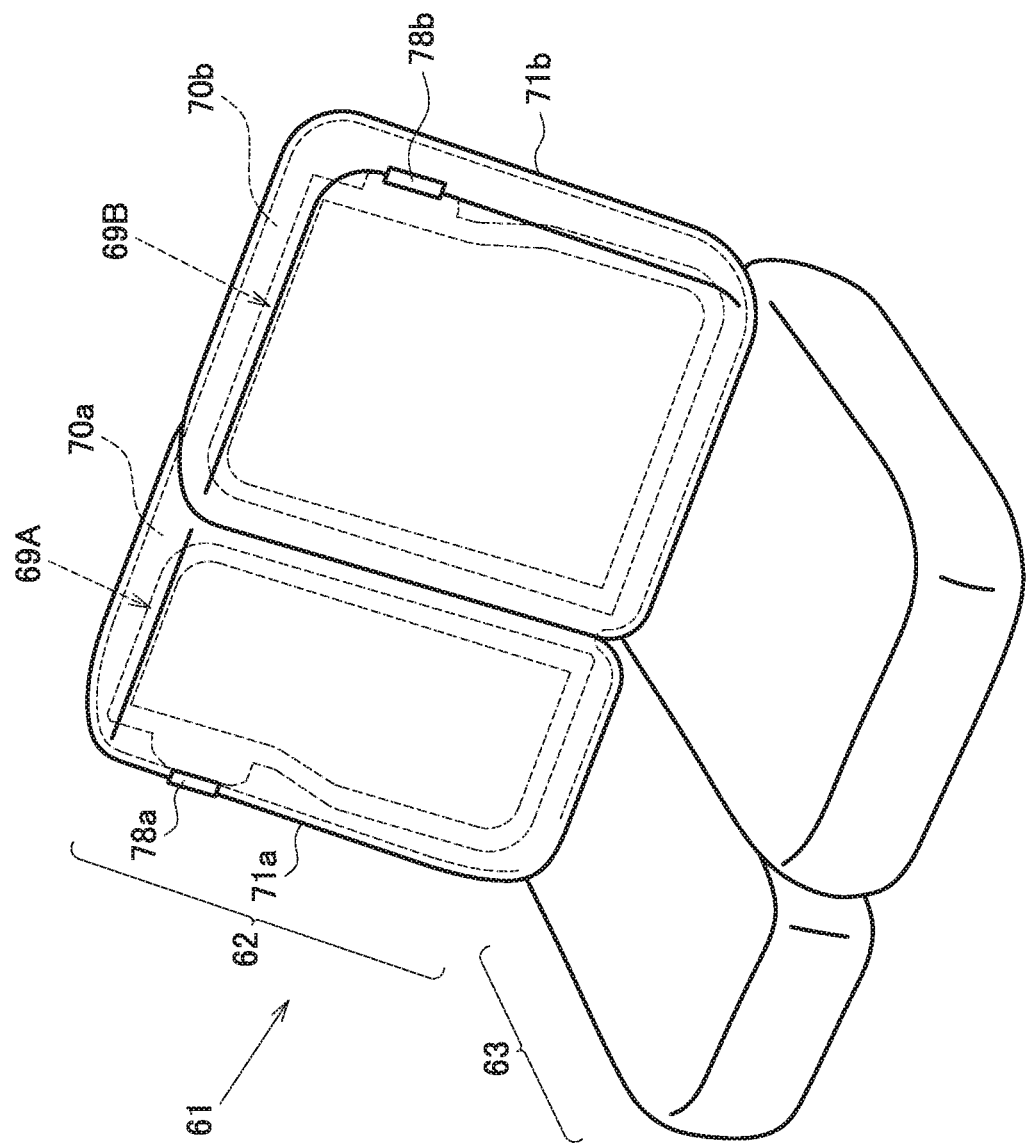
FIG. 8 is a perspective view showing another example of the vehicle seat in which the seat frame according to the present invention is accommodated.

FIG. 8 shows another example of the vehicle seat in which the seat frame according to the present invention is accommodated. A vehicle seat 61 is a rear-section seat; i.e., a "rear seat." The vehicle seat 61 has a seat back 62 for accommodating the back of a seated person, and a seat cushion 63 on which the buttocks of the seated person rest. The seat frame according to the present invention is incorporated in the seat back 62.

The seat back 62 has: two back frames 69A and 69B, which are framework structures serving as the seat frame; pads 70a, 70b, which are elastic members provided to the periphery of the back frames 69A, 69B; and surface skins 71a, 71b that cover the pads 70a, 70b. The pads 70a, 70b are formed by, e.g., foamed urethane resin. The surface skin 71a, 71b is formed by a soft material such as fabric, leather, synthetic leather, or other material pleasant to the touch. The fabric is a cloth such as a woven or knitted material.

The back frame 69A is formed by linking frame bodies 72A and 72B using linkages 73a and 73b. Also, the back frame 69B is formed by linking two frame bodies 72C and 72D using linkages 73c and 73d. Each frame body 72A, 72B, 72C, and 72D comprises a single bend part 74 and rectilinear parts 75 extending from the two ends of the bend part 74.

Figure 10:
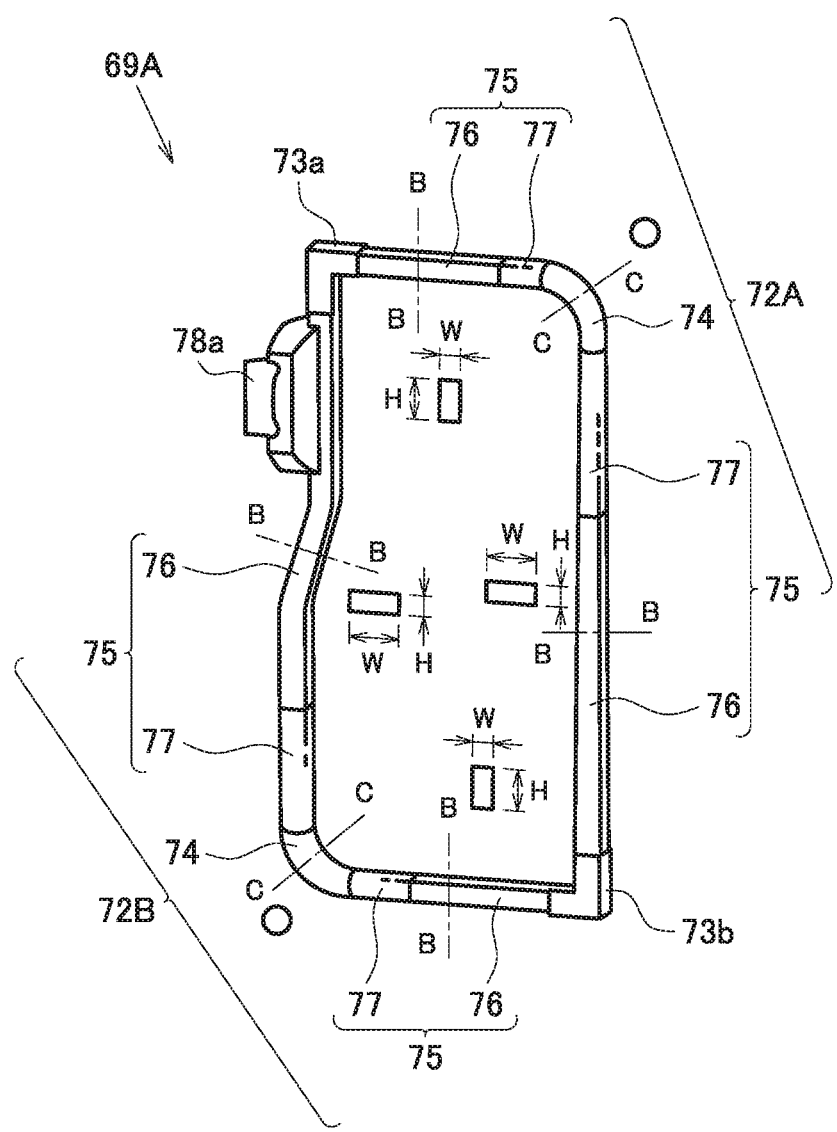
FIG. 10 is a perspective view showing a portion of the back frame of FIG. 9.

In the single back frame 69A, the rectilinear parts 75 of the frame body 72A and the frame body 72B have a rectangular cross section portion 76 and a cross-section-varying portion 77, as shown in FIG. 10. The cross-sectional shape of the rectangular cross section portion 76 is a rectangular shape having a width W and a height H as indicated by the cross-sectional shape along the line B-B. The cross-sectional shape of the bend part 74 is circular as indicated by the cross-sectional shape along the line C-C. The cross-section-varying portion 77 gradually varies in cross-sectional shape from a rectangular shape to a circular shape, the end part connected to the rectangular cross section portion 76 being rectangular in cross section, and the end part connected to the bend part 74 being circular in cross section. An operating part 78a for a locking mechanism is attached to the upper end part of the rectilinear part 75 in the vertical direction of the frame body 72B.

Figure 9:
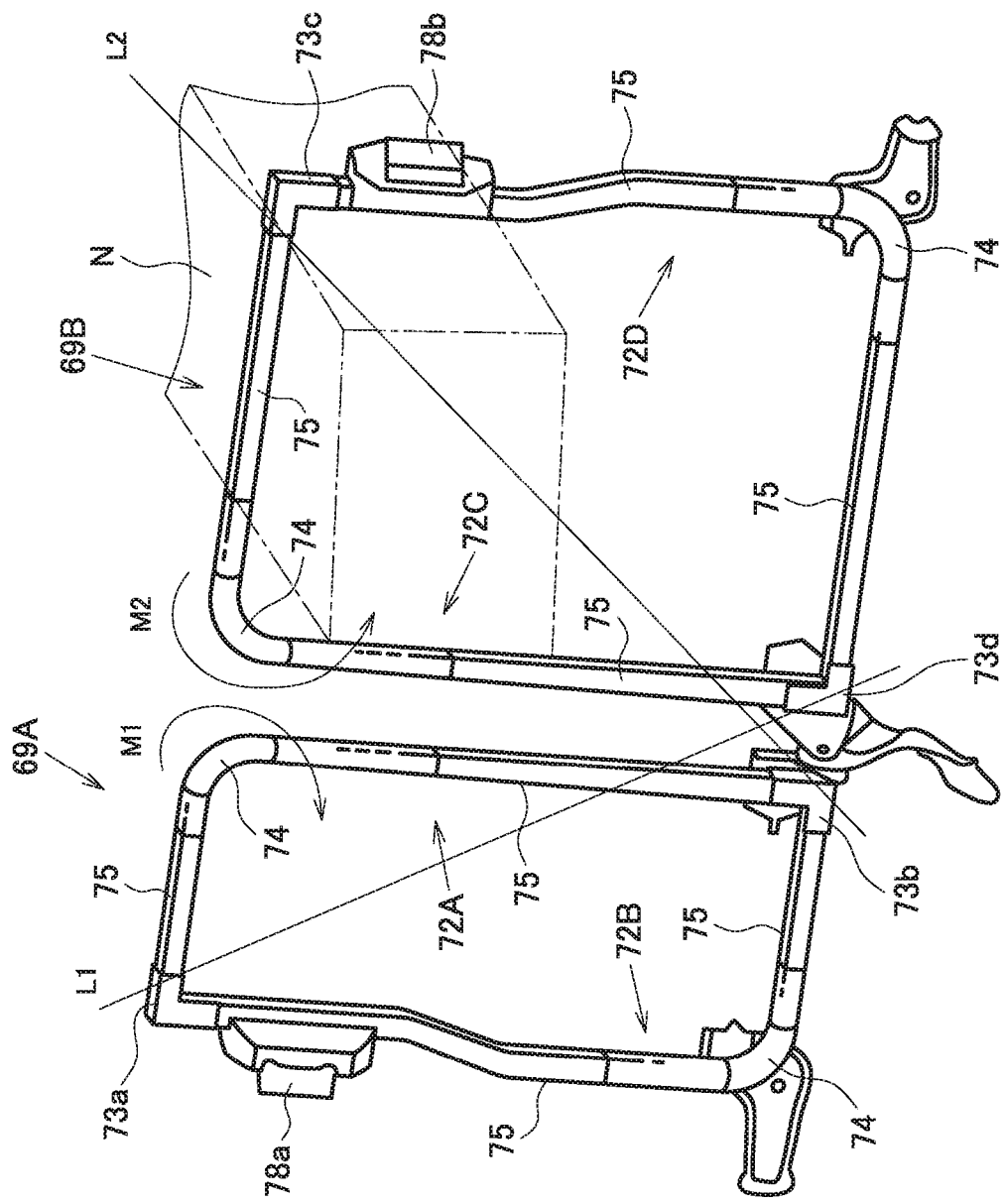
FIG. 9 is a perspective view showing a back frame, which is an embodiment of the seat frame according to the present invention.
Figure 11:
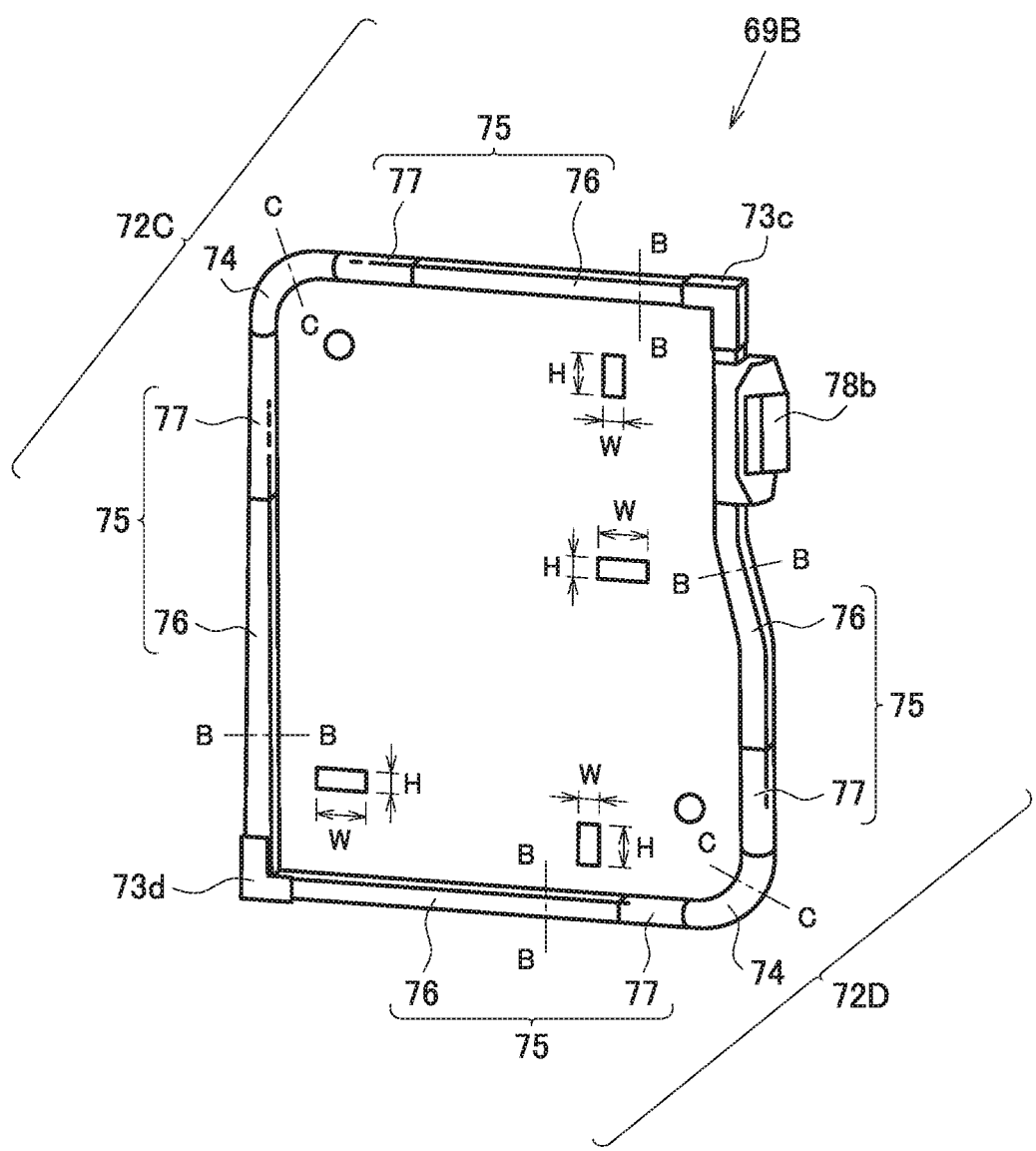
FIG. 11 is a perspective view showing another portion of the back frame of FIG. 9.

In the other single back frame 69B in FIG. 9, the rectilinear parts 75 of the frame body 72C and the frame body 72D have a rectangular cross section portion 76 and a cross-section-varying portion 77, as shown in FIG. 11. The cross-sectional shape of the rectangular cross section portion 76 is a rectangular shape having a width W and a height H as indicated by the cross-sectional shape along the line B-B. The cross-sectional shape of the bend part 74 is circular as indicated the by cross-sectional shape along the line C-C. The cross-section-varying portion 77 gradually varies in cross-sectional shape between a rectangular shape and a circular shape, the end part connected to the rectangular cross section portion 76 being rectangular in cross section, and the end part connected to the bend part 74 being circular in cross section. An operating part 78b for a locking mechanism is attached to the upper end part of the rectilinear part 75 extending in the vertical direction of the frame body 72D.

In FIG. 10, the linkages 73a and 73b connect the end part, which is rectangular in cross section, of the rectilinear part 75 of the frame body 72A and the end part, which is rectangular in cross section, of the rectilinear part 75 of the frame body 72B. Also, in FIG. 11, the linkages 73c and 73d connect the end part, which is rectangular in cross section, of the rectilinear part 75 of the frame body 72C and the end part, which is rectangular in cross section, of the rectilinear part 75 of the frame body 72D.

(Fabrication of Frame Bodies 72A, 72B, 72C, 72D of the Back Frames 69A, 69B)

The frame bodies 72A, 72B, 72C, 72D of the back frames 69A, 69B are fabricated in the same manner as the fabrication of the frame body 12 of the back frame 9 described using FIG. 5, and the fabrication of the frame body 23 of the cushion frame 20 of FIG. 7.

Specifically, first, the blank 51 having a shape suitable for each frame body 72A, 72B, 72C, 72D is punched out from the single starting material 50, as shown in FIG. 4. The blank 51 is subjected to the first bending (1st), the second bending (2nd), and the third bending (3rd) shown in FIG. 5, and a single tubular member 54 having a shape suitable for each frame body 72A, 72B, 72C, 72D is fabricated.

Next, the tubular member 54 undergoes the fourth bending (4th), and the frame bodies 72A and 72B as shown in FIG. 10 and the frame bodies 72C and 72D as shown in FIG. 11 are fabricated. The manner in which the cross-sectional shape of the blank 51 varies from the first bending (1st) to the third bending (3rd) is the same as the case of the frame body 12 of the back frame 9 of FIG. 2, and specifically, is as shown in FIG. 6.

As described above, the frame bodies 72A, 72B of the back frame 69A of FIG. 9, and the frame bodies 72C, 72D of the back frame 69B can be fabricated by a very simple process in which the single blank 51 is bent several times and undergoes simple partial welding. Accordingly, the cost of these frame bodies is low and fabrication can be performed in an inexpensive manner.

Also, in the present embodiment, the frame bodies 72A, 72B, 72C, 72D are formed by a tubular member having a closed cross-sectional shape that is circular in cross section and rectangular in cross section, and therefore, sufficient strength can be obtained by the closed cross-sectional shape. Accordingly, the thickness of the blank 51, which is the starting material, can be reduced to, e.g., 0.5 to 1.0 mm when high-strength steel or the like having, e.g., iron as a main component is used. It is thereby possible to obtain back frames 69A, 69B having high strength while being lightweight. The thickness of the starting material varies in accordance with the required material strength and the required performance of the frame.

When luggage N has been placed in the luggage compartment of a vehicle equipped with the back frames 69A, 69B of the present embodiment shown in FIG. 9, the luggage N collides with the back frames 69A, 69B due to inertial force and bending loads M1 and M2 are applied to the back frames 69A, 69B. As a result, a large force is likely to be applied to the back frames 69A, 69B in the locations of the broken lines L1, L2. However, in the present embodiment, the cross-sectional shape of the frame bodies 72A and 72C (in some cases, the frame bodies 72B and 72D) in the portions corresponding to the broken lines L1, L2 is rectangular, is high in strength, and can therefore sufficiently withstand an instantaneous collision load.

Other Embodiments

The present invention was described above using advantageous embodiments, but the present invention is not limited to the embodiments, and various modifications can be made within the scope of the invention stated in the claims.

For example, the seat frame according to the present invention is not limited to the back frame 9 and cushion frame 20 shown in FIG. 2, or the back frames 69A, 69B shown in FIG. 9, or other frames, and application is also possible in seat frames provided in any location of a vehicle seat.

Figure 12:
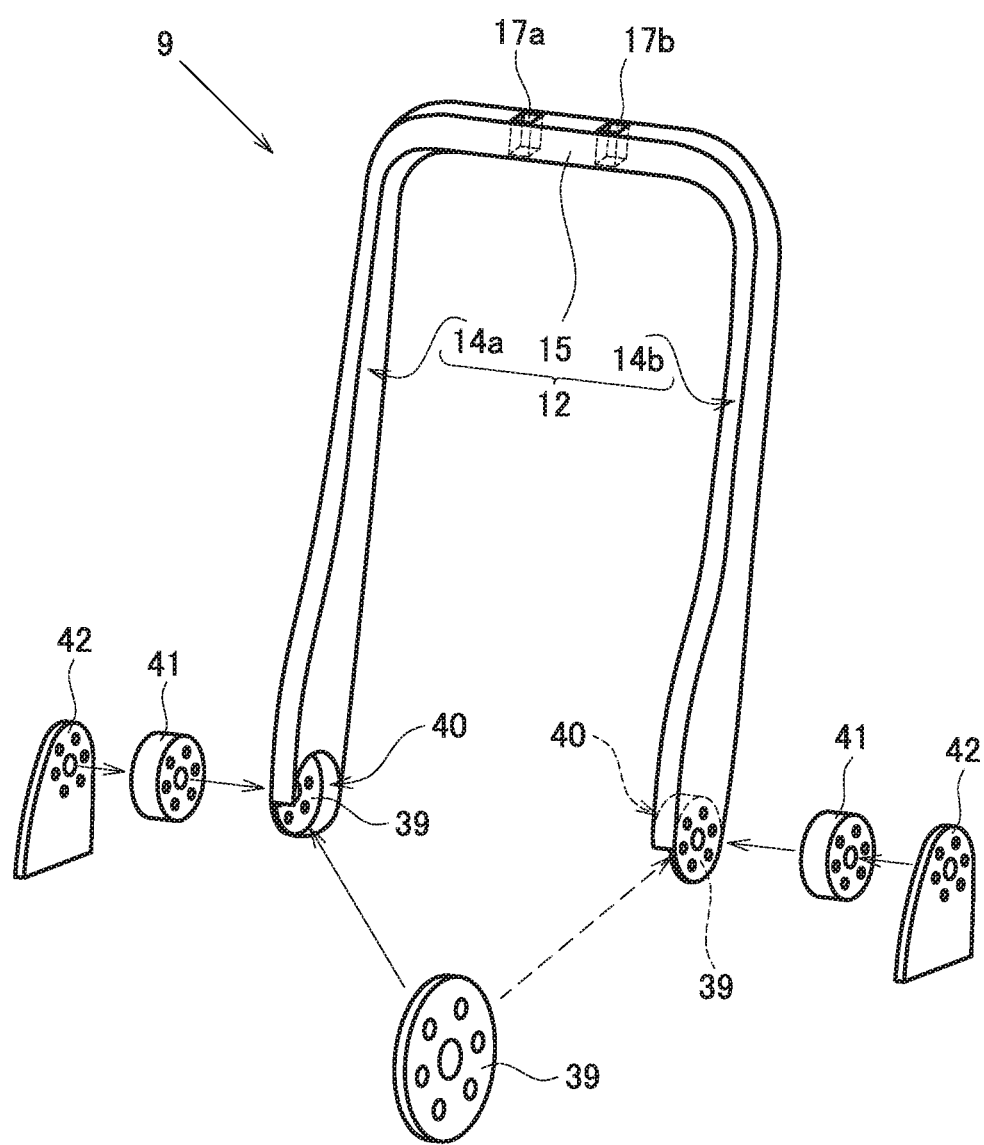
FIG. 12 is a perspective view showing another embodiment of the back frame.

Also, in the above-described embodiments, separate headrest guides 17a, 17b composed of iron or another metal were fabricated in a separate step from the step for fabricating the back frame 9, as shown in FIG. 2, and the headrest guides 17a, 17b were secured by welding or the like to the back frame 9 serving as a base unit. However, in lieu thereof, the headrest guides 17a, 17b, which are receiving sections for a headrest, may be integrally molded with the back frame 9 at the upper part of the back frame 9, as shown in FIG. 12. Doing so allows the overall weight of the back frame 9 to be reduced and the back frame 9 to be fabricated at low cost.

The headrest guides 17a, 17b in FIG. 12 are through-holes that are rectangular in cross section. However, the cross-sectional shape of the headrest guides 17a, 17b can be a circular shape or any other shape. A portion of the back frame 9 of FIG. 2 was rectangular in cross section, and the other portion was circular in cross section. In contrast, the entire back frame 9 of FIG. 12 is formed rectangular in cross section.

REFERENCE SIGNS LIST

1. Vehicle seat, 2. Seat back, 3. Seat cushion, 4. Headrest, 7. Floor of vehicle, 8a, 8b. Rails, 9. Back frame (Seat frame), 10. Pad, 11. Surface skin, 12. Frame body, 14a. Left-side side frame, 14b. Right-side side frame, 15. Upper linkage frame, 15a. Bend part, 15b. Rectilinear part, 16. Lower linkage frame, 17a, 17b. Headrest guides, 20. Cushion frame (Seat frame), 21. Pad, 22. Surface skin, 23. Frame body, 25a. Left-side side frame, 25b. Right-side side frame, 26. Linkage frame, 26a. Bend part, 26b. Rectilinear part, 29. Front rod, 30. Rear rod, 31a, 31b, 31c, 31d. Links, 34. Slot, 35. Internal teeth, 36. Gear, 39. Reinforcement plate, 40. Notch, 41. Recliner, 42. Brackets, 45. Rectangular cross section portion, 46. Cross-section-varying portion, 50. Starting material, 51. Blank material, 52. Both ends, 53. Side surface, 54. tubular member, 61. Vehicle seat, 62. Seat back, 63. Seat cushion, 69A, 69B. Back frames (seat frames), 70a, 70b. Pads, 71a, 71b. Surface skin, 72A, 72B, 72C, 72D. Frame bodies, 73a, 73b, 73c, 73d. Linkages, 74. Bend part, 75. Rectilinear part, 76. Rectangular cross section portion, 77. Cross-section-varying portion, 78a, 78b. Operating parts

The invention claimed is:

1. A seat frame for a framework structure of a vehicle seat, the seat frame comprising:
   a plurality of frame bodies formed by bending a single tubular member,
   wherein the single tubular member is formed in a closed cross-sectional shape by a single long and flat member being bent in a direction that is at a right angle with respect to the lengthwise direction of the long and flat member, and then end edges of the tubular member that have come to face each other being joined together by welding,
   wherein each of the plurality of frame bodies comprises a bend part and rectilinear parts,
   wherein the bend part is circular in cross section,
   wherein the rectilinear parts comprise a rectangular cross section portion and a cross-section-varying portion,
   wherein an end part of the cross-section-varying portion, connected to the rectangular cross section portion, is rectangular in cross section,
   wherein an end part of the cross-section-varying portion, connected to the bend part, is circular in cross section,
   wherein the cross-section-varying portion gradually varies in a cross-sectional shape from a rectangular shape to a circular shape, and
   wherein ends of the rectilinear parts of one of the frame bodies are connected to ends of the rectilinear parts of another one of the frame bodies by linkages to form the seat frame having a rectangular shape.

2. The seat frame according to claim 1, wherein a process, for causing the end edges of the tubular member to face each other by the single long and flat member being bent in the direction that is at the right angle with respect to the lengthwise direction of the long and flat member, includes a plurality of bending processes.

3. The seat frame according to claim 1, wherein the rectangular shape of the seat frame has a square shape.

4. The seat frame according to claim 1, wherein one of the linkages connects the ends of the rectilinear parts of said one of the frame bodies to each other.

5. The seat frame according to claim 4, wherein another one of the linkages connects the ends of the rectilinear parts of said another one of the frame bodies to each other.

6. The seat frame according to claim 5, wherein said one of the linkages is connected to said another one of the linkages to connect the ends of the rectilinear parts of said one of the frame bodies to the ends of the rectilinear parts of said another one of the frame bodies.

7. The seat frame according to claim 1, wherein the ends of the rectilinear parts of said one of the frame bodies include:
   an end of the cross-section-varying portion of one of the rectilinear parts of said one of the frame bodies; and
   an end of the cross-section-varying portion of another one of the rectilinear parts of said one of the frame bodies.

8. The seat frame according to claim 7, wherein one of the linkages connects the end of the cross-section-varying portion of said one of the rectilinear parts of said one of the frame bodies to the end of the cross-section-varying portion of said another one of the rectilinear parts of said one of the frame bodies.

9. The seat frame according to claim 8, wherein the ends of the rectilinear parts of said another one of the frame bodies include:
   an end of the cross-section-varying portion of one of the rectilinear parts of said another one of the frame bodies; and
   an end of the cross-section-varying portion of another one of the rectilinear parts of said another one of the frame bodies.

10. The seat frame according to claim 9, wherein another one of the linkages connects the end of the cross-section-varying portion of said one of the rectilinear parts of said another one of the frame bodies to the end of the cross-section-varying portion of said another one of the rectilinear parts of said another one of the frame bodies.

11. The seat frame according to claim 7, wherein another end of the cross-section-varying portion of said one of the rectilinear parts of said one of the frame bodies is connected to the end part of the cross-section-varying portion of said one of the rectilinear parts of said one of the frame bodies.

12. The seat frame according to claim 11, wherein the ends of the rectilinear parts of said another one of the frame bodies include:

an end of the cross-section-varying portion of one of the
   rectilinear parts of said another one of the frame bodies;
   and
an end of the cross-section-varying portion of another one
   of the rectilinear parts of said another one of the frame
   bodies.

13. The seat frame according to claim 12, wherein another end of the cross-section-varying portion of said one of the rectilinear parts of said another one of the frame bodies is connected to the end part of the cross-section-varying portion of said another one of the rectilinear parts of said another one of the frame bodies.

\* \* \* \* \*